UNITED STATES PATENT OFFICE.

DAVID MARCUS, OF LONDON, ENGLAND.

LACQUER AND LACQUERING.

SPECIFICATION forming part of Letters Patent No. 603,913, dated May 10, 1898.

Application filed August 30, 1897. Serial No. 650,054. (No specimens.)

*To all whom it may concern:*

Be it known that I, DAVID MARCUS, a subject of the Queen of Great Britain and Ireland, residing in the city of London, England, have invented certain Improvements in Lacquers and Lacquering, of which the following is a specification.

My invention has for its object to manufacture from the juice of the *Rhus vernicifera* (a plant or tree which grows in Japan, China, and India) materials suitable for covering or coating surfaces to protect them and improve their appearance. The said materials are applicable for use for covering the bodies of locomotives, railway-vehicles, yachts, boats or ships, and other surfaces, and the coating is designed more especially for large surfaces, although it is not limited thereto. It can be made of a consistency such that it can be readily applied like a paint or varnish; but, if desired, it can be made of a consistency to be applied as a cement. It will dry or become hard rapidly and with certainty, thus doing away with the necessity of effecting the hardening in a dark chamber, as has hitherto been necessary with lacquers or surface-covering materials made from the said juice. Such artificial hardening is inconvenient, especially where large surfaces have to be treated.

The juice of the *Rhus vernicifera* is clarified by heating, stirring, straining, filtering, or other usual or suitable processes and is then very glutinous and sticky. When applied in this condition to surfaces, it remains moist or "tacky" or in an unset or soft condition for such a length of time as to make it practically useless for application to large surfaces. By my invention I overcome this objection by providing preparations from the mixture of the juice of the *Rhus vernicifera* with other materials such that while retaining the good qualities of the said juice the preparations will dry or become hardened.

For the first or primary coat or coats I mix with the said juice permanganate of potash, giving a mixture which when applied, for example, to iron or steel or other metal surfaces, will prevent rust and protect the metal against the action of acids. A suitable proportion of permanganate of potash is from three to ten parts, by weight, thereof to from ninety-seven to ninety parts, by weight, of the said juice. The permanganate of potash should be finely ground and thoroughly stirred and incorporated with the said juice.

When it is required to produce a smooth surface, a "filling" may be made of a mixture of the juice with finely-powdered slate or ocher, the mixture being thinned with methylated spirit to reduce it to a condition for ready application to the surface, the spirit rapidly evaporating and the mixture rapidly becoming dry and hard. This mixture can be applied over that first described, or it can be omitted where the surface is sufficiently smooth without it, and I do not claim this filling mixture.

For succeeding coats I add drop-black (a carbon-black) or chrome (chromate of lead) to the juice, and I thin the mixture to a consistency for ready application to the surfaces by the addition of camphor-oil, and when the camphor evaporates the drop-black or chrome has the effect of causing the coating to rapidly dry and become hard. Suitable proportions are twenty parts, by weight, of drop-black or chrome to eighty parts, by weight, of the juice and twenty-five parts, by weight, of the camphor-oil.

Where high-class finish of the surfaces is desired, I may employ a coating prepared as follows: I boil hard copal with camphor-oil until the camphor-oil holds sufficient copal to make the mixture adhesive, and then I pass the vapor arising from this mixture when heated through litharge, which may be effected by placing the mixture in a vesssel having suspended in it a bag or receptacle containing the litharge. On heat being applied to the vessel the vapor of the camphor and copal liquid passes through the litharge and is collected and cooled, and from, say, about five to ten parts, by weight, of the substance obtained are mixed with about ninety-five to ninety parts, by weight, of the juice of the *Rhus vernicifera*. This product should then be thinned by the addition of from about three to seven parts, by weight, of absolute alcohol, and it can then be applied to the surface by means of a brush, and it will dry and become hard rapidly and evenly.

The several mixtures formed as aforesaid can be colored as required by the addition, for example, of red oxid of iron, protoxid of iron, Dutch pink, pure Chinese vermilion, penta-sulfid of arsenic, or Prussian blue, and Chinese white. The mixture of the last two pigments produces a bluish gray.

The several coatings described may be applied one upon the other—as, for instance, in the order described—or may be employed separately and independently.

The several coats can be smoothed before the application of the next coat. This may be done after the manner used for surfacing the coats applied to carriage-bodies.

Although I have described the best means with which I am acquainted for carrying my invention into effect, I do not limit myself to the precise details stated, nor do I limit myself to the precise proportions given; but

I claim as my invention—

1. The process of lacquering or covering surfaces by applying thereto a mixture of the juice of the *Rhus vernicifera* and permanganate of potash and then a mixture of the said juice with drop-black or chrome thinned with methylated spirit and then a mixture (thinned with absolute alcohol), of the said juice, with a substance obtained by passing the vapor arising from heated copal and camphor through litharge.

2. The process of lacquering or covering surfaces by applying thereto a mixture of the juice of the *Rhus vernicifera* and permanganate of potash and then a mixture (thinned with absolute alcohol) of the said juice with a substance obtained by passing the vapor arising from heated copal and camphor through litharge.

3. For lacquering or covering surfaces, a material formed by the mixture of the juice of the *Rhus vernicifera* with the product of condensation of vapor from heated copal and camphor passed through litharge, the mixture being thinned with absolute alcohol.

4. For lacquering or covering surfaces, a material formed by the mixture with the juice of the *Rhus vernicifera* of from five to ten per cent. of the product of condensation of the vapor from heated copal and camphor passed through litharge, the mixture being thinned by the addition of from three to seven per cent. of absolute alcohol.

5. For lacquering or coating surfaces, the mixture of the juice of the *Rhus vernicifera* with a product obtained by passing the vapor from heated copal and camphor through litharge.

In testimony whereof I have signed my name to this specification in the presence of two subscribing witnesses.

DAVID MARCUS.

Witnesses:
FRAS. A. CORNE,
W. S. NICOLL.